Aug. 17, 1943.　　　O. W. LYONS ET AL　　　2,327,051
APPARATUS FOR TREATING WELLS
Filed July 27, 1940
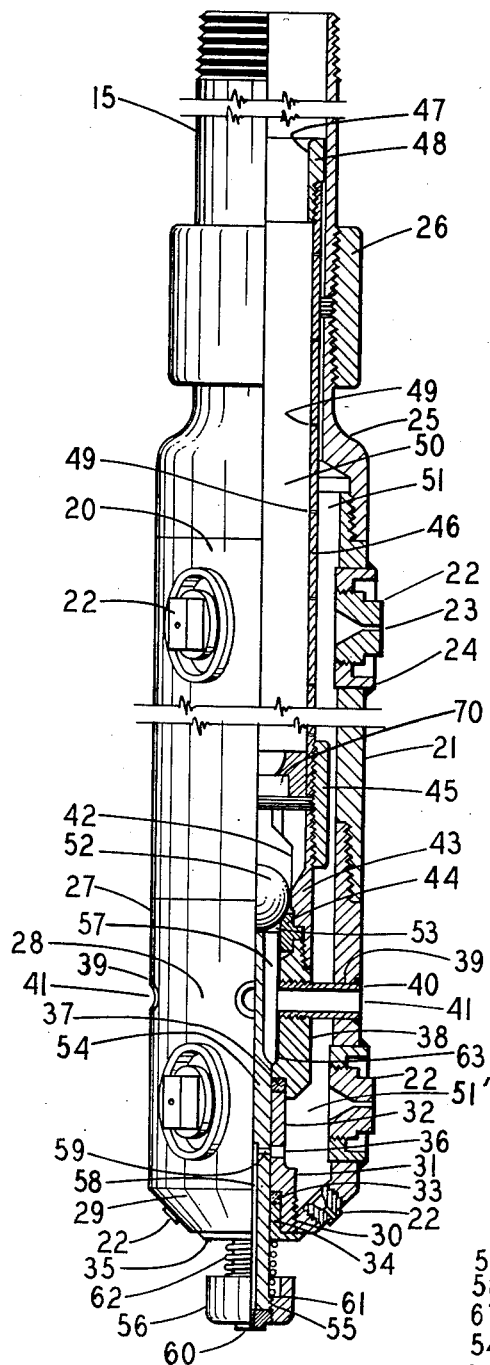
FIG. 2
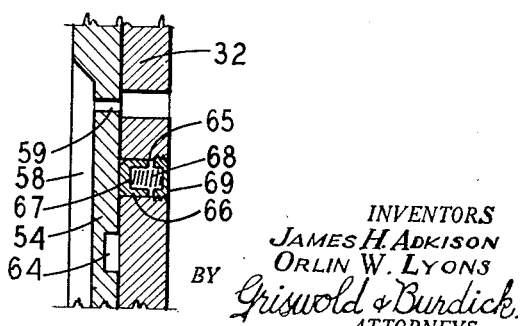
FIG. 1
FIG. 3
INVENTORS
JAMES H. ADKISON
ORLIN W. LYONS
BY Griswold & Burdick
ATTORNEYS.

Patented Aug. 17, 1943

2,327,051

UNITED STATES PATENT OFFICE 2,327,051

APPARATUS FOR TREATING WELLS

Orlin W. Lyons, Tulsa, Okla., and James H. Adkison, Midland, Tex., assignors to The Dow Chemical Company, Midland, Mich., a corporation of Michigan Application July 27, 1940, Serial No. 347,828

2 Claims. (Cl. 166—20)

This invention relates to an improved apparatus for treating a well, such as an oil, gas or water well, to increase the production thereof. It more particularly relates to an improved method and apparatus for treating a limestone or calcareous formation, or other stratum of a well containing lime, to increase the production therefrom.

Heretofore wells, especially oil and gas wells, producing from calcareous formations have been treated with hydrochloric acid to cause an increase in their production as a result of the acid attacking the formation and increasing the permeability and porosity of the same, thus enabling the oil or gas to flow more freely under its natural pressure from the formation into the well hole. Examples of such treatments of a well are taught in United States Letters Patent Nos. 556,669 and 1,877,504.

While the acid treatment or acidizing of wells has in recent years been generally successful, nevertheless it has been attended in many instances of its application by features concerning which it is the object of this invention to improve.

This invention concerns an improved apparatus for acidizing or treating the calcareous producing formations of wells with acid to more positively insure an increase in the production therefrom, and further concerns practices wherein the face of the producing formation exposed in the well hole is first subjected to a scouring or cleansing action by directing jets of acid thereon to remove deposits therefrom and to form, or initiate the forming of, channels therein. Thereafter the formation is treated with an unrestricted stream of acid under pressure to force the same back into the formation and increase its porosity and permeability and enhance its production. However, by virtue of this present invention, the fluid of the well may be circulated both before and after the acidizing treatment in order to either clean the well prior to acidizing or to clean and condition the well subsequent thereto, and moreover this circulation may be effected without the necessity of pulling or otherwise moving the tubing or other device employed. Additionally, the acid employed may be recirculated and thereby reused until spent. As a result of practicing this invention, materially increased benefits are to be had over the conventional manner of acidizing wells, and these will become evident upon a full appreciation of the improved method and apparatus for treating wells herein described.

While this invention may be conveniently practiced in oil, gas, water, brine or other type wells, it is perceived that one of its greatest applications will be in conjunction with oil wells, and therefore the practice of this invention will herein, for the sake of brevity, be described only as applied to such wells. But it is to be understood that the practice of the invention is in no way limited thereto.

The principal object of this invention is to provide an improved apparatus for treating a well to increase the production thereof.

Another object of this invention is to provide an improved apparatus for treating a well to increase the permeability and porosity of the producing formation thereof.

Another object of this invention is to provide an improved apparatus for acidizing a well to more positively insure the increase of production therefrom.

Another object of this invention is to provide an improved apparatus for acidizing a well to more positively insure an increase in the permeability and porosity of the producing formation thereof and thereby insure the penetration of the acid into the formation to increase the production therefrom.

Still another object of this invention is to provide an improved apparatus for acidizing a well to increase the production thereof, wherein the fluid of the well may be circulated either before or after the acidizing thereof, and wherein the acid employed to treat the well may be recirculated and reused to further treat the well without the necessity of pulling or otherwise moving the tubing or other device employed.

Other objects and advantages will become apparent from the following description of the invention hereinafter fully described and particularly pointed out in the claims.

Attention is now directed to the drawing illustrating one embodiment of an apparatus for practicing the same, which drawing comprises a part of this specification, and wherein:

Fig. 1 is a vertical cross-sectional view of a well hole illustrating a casing, or other type pipe, cemented therein, and shows a string of tubing, or other type pipe, having incorporated therein one form of device for realizing this invention which is shown lowered into the well hole.

Fig. 2 is a sectional side view, partly in longitudinal cross-section, showing in detail the device illustrated in general in Fig. 1.

Fig. 3 is a fragmentary detailed view of a modification of a part of the device illustrated in Fig. 2.

Before proceeding with a description of the detailed structure of a form of apparatus capable of practicing the invention and the method thereof, some of the conditions under which the invention is to be used will first be briefly explained. In Fig. 1 there is illustrated a well hole showing the upper portion of the walls thereof supported by a casing pipe 10, while at least a part of the lower portion thereof is open hole, as is indicated by the side walls 11 thereof. The well hole has penetrated or traversed a calcareous oil producing formation 12 from which oil will normally flow into the well hole by virtue of the pressure existing in the stratum 12. The upper end of the casing pipe may be provided with any suitable type casing head having a pipe 13 leading therefrom controlled by a valve 14.

One form of apparatus for realizing this invention is shown generally in Fig. 1, supported in the well hole by a string of tubing 15. The apparatus consists in general of what will herein be termed an acidizing tool 20, which tool is illustrated in detail in Fig. 2.

From a consideration of Fig. 2, it will be seen that the acidizing tool 20 comprises a hollow cylindrical housing 21, which is preferably so formed as to include a plurality of interchangeable units or sections, each of which is provided with several nozzles 22 designed for the ejectment therethrough of acid under pressure and which are disposed in spaced relation about the circumference of the tool. Restricted orifices 23 are provided in each of the nozzles 22, which are secured in place by screw threaded engagement with circular retainers 24 positioned in apertures formed in the wall of the tool housing and welded thereto. Preferably the outer end of the nozzle is made square to facilitate its insertion and removal for repair or replacement.

The upper end or section of the acidizing tool housing is in screw threaded engagement with a reducing coupling 25, which in turn makes a similar engagement with a coupling collar 26, to which is screw threadedly fastened a section of tubing 15, such as shown in Fig. 1, and by virtue of which tubing, or a string thereof, the acidizing tool may be lowered and raised in and out of the well hole or positioned therein.

To the lower end or section of the acidizing tool housing there is screw threadedly connected a hollow cylindrical plug 27 having side walls 28 and a head 29, which plug forms a continuation of the housing 21 of the tool. Incorporated in the wall and head of the plug 27 are nozzles 22, which may be identical with or similar to the ones previously described.

Within the screw threaded aperture 30 formed in the head 29 of the plug is screw fitted the expanded lower end 31 of a hollow sleeve 32. The expanded lower end of sleeve 32 is provided with a recessed annular seat for packing 33, which is secured in position by packing gland ring 34 formed with the flanged head 35. A port 36 is formed in sleeve 32, while the upper end thereof abuts and compresses a packing ring 37 disposed in an annular seat formed in the lower end of a tube or tubular-like member 38.

In the walls 28 of plug 27 there are formed a plurality of apertures, such as the one designated by the reference numeral 39, into which stub tubes 40 are welded so as to extend horizontally through to the interior of the plug where they make screw threaded connection with the tube 38 to provide unrestricted ports 41 affording communication between the interior of tube 38 and the exterior of the plug 27 and the tool 20.

To the upper end of tube 38 is screw fitted a ball cage 42, the inwardly protruding shoulder 43 of which engages a complementary shoulder on the beveled ball valve seat 44 so as to hold said valve seat in place upon the top end of said tube 38. A coupling sleeve 45 screw threadedly engages the upper end of the ball cage to connect thereto a hollow cylindrical strainer tube 46. Strainer 46 extends throughout the major portion of the interior of the tool housing 21 and may further extend upwardly into the lower portion of tubing 15. The upper end of strainer 46 is screw threadedly fastened to the collar 47, having an outwardly flared sealing head 48, which is adapted to move in the tubing 15 in sliding sealing engagement. Strainer tube 46 is formed throughout its length with a plurality of longitudinally and circumferentially spaced strainer ports 49 of a diameter preferably smaller than the nozzle orifices 23. Thus by virtue of the arrangement of strainer tube 46 within the housing 21 of the tool there is provided a central chamber 50 and an annular chamber 51 communicating through the strainer ports 49.

It is contemplated that the strainer sleeve 46 be formed with a fixed length such as will fit and accommodate a predetermined number of the interchangeable units or sections of which the acidizing tool is composed. Then when fewer sections or units of the tool are employed, than that for which the strainer sleeve was originally designed, the same may be conveniently moved upwardly into the tubing 15, as is shown in Fig. 2, thus obviating the necessity of providing a separate strainer sleeve of definite length for each number of units or sections of the acidizing tool in use.

Under normal conditions the ball 52 is at rest upon the beveled ball valve seat 44 to close port or passage 53 formed therein. An elongated valve stem 54 is slidably disposed within the tube 38 and the sleeve 32 and projects outwardly from the head 29 of plug 27 a relatively short distance. The lower end of valve stem 54 screw threadedly engages a passage 55 formed in a foot-like member 56. The upper portion of the stem 54, which is slidably disposed interiorly of the tube 38, is formed with fins 57 having channels therebetween to permit liquid entering chamber 50 to pass through the ball cage 42 and port 53 so as to enter tubes 40 and issue from the tool through ports 41 when the ball is in an unseated position. The intermediate portion of the stem 54 is solid, while the lower portion thereof is hollow to form a passage 58 which communicates with the lower portion of chamber 51 through ports 59 and 36.

The foot member 56 is provided with a nozzle 60 screw threadedly fastened in the passage 55 so that liquid flowing from chamber 51 through ports 36 and 59 and passage 58 may issue from the orifice provided in nozzle 60 in a manner similar to and for the purpose of that of nozzles 22 and orifices 23. Foot member 56 is further formed on its upper side with a recess to provide a seat or annular shoulder 61 for spring 62. The other end of the spring 62 bears against the flanged head 35 of the packing gland 34. The action of spring 62 maintains the valve stem in the position illustrated in Fig. 2, wherein the lower end of the fins 57 thereof are caused to abut the shoulder 63 formed interiorly of the tube 38 and thereby limit the downward movement of valve stem 54 under the action of the spring, thus allowing the ball 52 to rest upon seat 44 to close port 53.

One of the preferred manners of practicing this invention and of realizing the benefits thereof will now be described with reference to Fig. 1, wherein a device such as has been described in conjunction with Fig. 2 will be employed.

Assuming that the stratum 12 shown in Fig. 1 is a calcareous oil producing formation which is to be treated to increase its production, it will then be necessary to lower into the well hole the tubing 15 with the acidizing tool 20 connected to the lower end thereof, and to position and secure the same in the well hole opposite the formation to be treated.

When the tool is lowered into the well hole, the parts thereof will be in the positions indicated in Fig. 2, and as the tool is lowered through the liquid in the well, the same may have a tendency to enter the ports 41 and unseat the ball 52, allowing the liquid to enter chamber 50 and possibly chamber 51 and even the nozzles 22, although the strainer tube 46 will tend to minimize the latter action. However, if any liquid enters the tool, it can be readily displaced therefrom by merely setting the foot member 56 on the bottom of the well hole, which will cause the valve stem 4 to move upwardly so as to unseat the ball 52 from seat 44, and forcing liquid under pressure down the tubing 15 and into the acidizing tool, causing the well liquid and such foreign matter as may be present to be displaced from the tool and thus clean the same for reception of the well treating liquid. While the tool is in this position with the foot 56 engaging the bottom of the well hole, the continued introduction of liquid under pressure down the tubing 15 for escape through ports 41 can be utilized to circulate the liquid out of the well hole by forcing it upwardly therein between the walls of the hole or the casing and the tubing, and in this manner the well may be effectively cleaned of mud, detritus and foreign matter as a preparatory step to acidizing the formation.

To insure the proper application of the acid to the producing formation it may sometimes be expedient to place a blanket or seal, such as a heavy or viscous liquid, in the bottom of the well so that the upper level thereof is immediately below or substantially opposite the lowermost portion of the producing formation, such practice being well known in this art.

Heretofore it was not expedient to position such blankets or seals in the well hole when a tool of the general type herein described was in place in the well hole without first removing the same and introducing the blanket or seal through the tubing. If attempts were made to introduce the blanket or seal through the tubing with the tool suspended therefrom, clogging of the tool would generally result rendering it inoperative. However, with the acidizing tool herein described, the blanket or seal can be conveniently introduced into the well hole at any time with the tool therein, and placed on the bottom of the hole by merely pumping the blanket down the tubing while the foot 56 is engaged with the bottom of the well hole to open port 53, so that the blanket flows from the ports 41 of the tool without clogging the nozzles thereof.

Thereafter the acidizing tool may be lifted off the bottom of the well hole to close port 53 by allowing ball 52 to rest on seat 44. With the passage or port 53 closed the tool is suspended in the well hole opposite the formation to be treated. When the tool is suspended in the open hole, the fluid of the well also can be circulated to clean the same by applying pressure on the column of liquid standing in the well hole outside the tubing, causing the liquid to enter the tool through port 41, whereby ball 52 will be unseated opening port 53, thus allowing the well liquid to be circulated through the tool and up the tubing from the well bore.

After the fluid of the well has been circulated or washed and the acidizing tool properly positioned therein, an aqueous solution of hydrochloric acid, which is preferably inhibited against corrosive attack upon iron or steel, and of between about 5 and 25 per cent concentration by weight, is introduced under pressure into the tubing 15 and forced downwardly therethrough so as to enter chamber 50 of the acidizing tool 20. The flow of liquid into the tool causes ball 52 to be held securely upon seat 44 to close port or passage 53. From chamber 50 of the acidizing tool the acid will be forced, by virtue of the pressure under which it is supplied, through the strainer 46. The acid entering chamber 51 is forced therefrom through each of the several nozzle orifices 23 in the form of jets of acid, such as shown by the dotted lines in Fig. 1 and designated by the reference numeral 16. The strainer acts to relieve the acid of any small particles it may have contained or picked up in passing through the length of tubing 15 and which would tend to clog up the nozzle orifices 23.

The jets of acid issuing from the tool at high pressure and a considerable velocity are directed to and will impinge upon the walls of the calcareous producing formation 12 and act by their force and chemical action to clean the same of sheaths or coatings, such as those formed by paraffin, calcareous mud and like deposits, or of other surface coatings tending to plug the producing formation or the surface thereof. Also to a certain extent the jets will tend to enlarge the diameter of the well, resulting in presenting bore walls of a clean nature, as well as an enlarged well cavity, thus presenting a larger surface for the application and penetration of the acid.

Continued application of the jets of hydrochloric acid to the calcareous oil producing formation will, as a result of the action of the acid thereon, serve to remove by chemical action at least some of the restrictions in the channels of the formation and serve to enlarge the diameter of existing channels, and further will have a tendency to form new channels therein, thus effecting a general and material increase in the permeability and porosity of the formation, which will be highly effective for the purposes of subsequent treatment of the formation.

Thereafter the acidizing tool is lowered into the well hole until the foot 56 strikes the bottom thereof, causing valve stem 54 to move upwardly unseating ball 52 from the valve seat 44, thus opening port 53. During this operation the introduction of acid under pressure into the tubing 15 may be continued or suspended as is desired. However, when port or passage 53 is in an open position, the continued introduction of acid under pressure into the tubing will result in the acid flowing in an unrestricted stream out of the ports 41 of the tool so that the producing formation can be further acidized at a more rapid rate. In this manner the producing formation is first cleaned of deposits and to some extent channels are formed therein by the jets of acid issuing from nozzles 22, and thereafter the acid issuing as an unrestricted stream from ports 41 is forced back into the formation to any desired extent where it will chemically attack the calcareous formation and render it more permeable and porous.

In most instances it will be found desirable to insure that when additional acid is applied to the producing formation by either the nozzles 22 or the ports 41 that it will be forced back thereinto by the pressure under which it is introduced into the well, so that it will not merely displace such fluids, as oil and water, that may be above it in the well hole. Therefore it has been found expedient to fill the well hole with a liquid such as oil or water and, after having first treated the formation as has been described, to continue the application of the acid under pressure to the calcareous formation. Then, when the application of such additional acid tends to displace the liquid above it, rather than enter the formation, that condition will be evidenced by a flow of liquid through the outlet of the casing head, for example, through such a pipe as shown at 13 in Fig. 1. When this condition occurs, valve 14 is closed so that as additional acid is forced into the well and directed to the calcareous formation, the acid will not be permitted to move upwardly in the well and displace the column of liquid above it, but instead is constrained to enter substantially only the producing formation, either as a stream of acid under high velocity, as in the form of a jet or as a body of acid under pressure, which in either instance will result in the acid attacking the formation to make it more permeable and porous.

After the well has been acidized as above described, it is then possible to clean the well up and put it back on production without first removing the tubing 15 and the acidizing tool 20. To accomplish this pressure is applied to the upper surface of the column of liquid standing in the annular space between the casing and tubing to force it downwardly and causing it to enter the ports 41 of the acidizing tool where it raises ball 52 to open port 53 so that the liquid, which may comprise spent acid, oil, water and suspended detritus, is free to flow upwardly out of the well through the tubing 15.

However, if it is deemed preferable that the fluid in the well be circulated in the opposite direction, namely down the tubing 15 and up the casing, in order to clean the well and put it on production without first removing the tubing and the acidizing tool, the tool is lowered into the well hole until the foot member 56 strikes the bottom thereof and forces the valve stem 54 upwardly so that ball 52 is raised, opening port 53. Thereafter pressure is applied down the tubing to force the liquid therein out through the ports 41, which will result in raising the column of liquid standing in the annular space and cause it to flow out the top of the well casing, thus removing therefrom the spent acid, oil, water, mud and other detritus.

If desired, the fluid in the well may be circulated and cleaned by either or both of the above methods subsequent to acidizing, and then retreated with acid as before. At any stage of treatment of the well the acid, after having been ejected or expelled from either the nozzles 22 or the ports 41, may be caused to re-enter the acidizing tool and tubing through the ports 41 and thereafter may be re-used to assure that all the acid is spent in its attack upon the formation. This may be conveniently accomplished by setting the foot member 56 on the bottom of the well hole so as to open port 53, applying pressure to the top of the liquid column in the well casing, forcing the acid in the well hole into the tool through the ports 41. Thereafter the application of pressure on the column of liquid standing in the casing is discontinued, and the acid is then re-applied under pressure to the formation by causing it to issue either through the nozzles 22 or the ports 41, as desired. Thus in this manner the acid is re-used to insure that it is fully spent in attacking the formation.

In accordance with the previous teachings herein of the practice of the invention, the same can be employed using an unrestricted stream of acid, such as issuing from ports 41, only when the foot 56 of the mechanism is in engagement with the bottom of the well hole to cause plunger 54 to open port 53. However, it is also within the scope of this invention and the practice thereof that by a slight modification various formations occurring at any depth within the well hole may be treated or acidized with an unrestricted stream of acid while the acidizing tool is suspended therein and with all parts thereof out of contact with the bottom of the well hole.

To accomplish such the hollow sleeve 32 and valve plunger 54 are slightly modified in the manner shown in Fig. 3 and by the dotted lines shown in Fig. 2. The valve stem 54, which is free to slide within the stationary sleeve 32 and tube 38, as previously described, is formed on its outer side with a circular recess 64 at a point slightly below the port 59. The hollow sleeve 32 is provided with a circular hole 65, which traverses one wall thereof, and a plug 66 fitted therein, which is formed with a seat 67 in the top thereof to receive one end of a coil spring 68. A closure cap 69 is screw threadedly fitted into the outer end of the hole 65 to compress and engage spring 68 and cause it to normally force the plug 66 against the outside of valve stem 54. Thus when the valve stem 54 is forced to move upwardly within sleeve 32, as when foot member 56 is caused to engage the bottom of the well hole, the plug 66 will be projected by spring 68 into the recess 64 as the same slides into alignment with hole 65. In this manner the plunger 54 will be locked in place while in its upward position and while disengaging ball 52 from seat 44 to open port 53. Additionally, a ball valve seat 70, is screw threadedly secured into the lower end of tube 46 at a point just above the ball cage 42.

With the modified structure shown in Fig. 3 and above-described, the acidizing tool may be positioned in the well hole opposite the producing formation and the same then treated with jets of acid as and for the purpose described, and the acidizing tool lowered into the well hole until the foot 56 forces the valve stem 54 upwardly until it locks in place with port or passage 53 open, thus affording communication between the chamber 50 and the exterior of the tool through ports 41. Thereafter the tool may be elevated to any point within the well hole and various sections thereof treated with an unrestricted stream of acid in the manner heretofore taught, and thereafter by dropping a ball similar to that shown at 52 into the upper end of the tubing 15 so that it passes downwardly therein and comes to rest on valve seat 70, the introduction of further acid to the tool will result in it issuing therefrom through the nozzles 22 in form of jets.

While the specific examples given for the practice of this invention have concerned the treatment of calcareous producing formations of an oil well with hydrochloric acid, it is to be understood that it is also within the scope of the invention that other kinds of wells may be similarly treated, that other types of producing formations be treated as herein taught, or if desired with other acids, or solutions thereof, such as hydrofluoric, sulphuric, nitric, or mixtures thereof, which will chemically attack and tend to dissolve the particular producing formation being treated. Thus, in the acidizing or treating of a well bore and the surrounding formations by the methods and mechanism as herein described, the following advantages, among others, are realized. The acidizing tool, after being lowered into the well hole and while in position therein, may be thoroughly cleaned of any foreign particles or well fluid which may have entered it tending to clog the same or the nozzles thereof.

Prior to and after the actual treatment of the well with acid, a fluid may be circulated in either direction through the tubing, well bore and casing in order to thoroughly clean the well of such matter as mud, water, oil and the like. The acid is also strained prior to entering the nozzle jets, whereby all foreign matter which might tend to clog the nozzle orifices is removed. Further, the formation may be first treated with jets of acid, and thereafter the well may be caused to circulate, and/or treated by additional jets of acid or by an unrestricted stream of acid, all without pulling or removing the tubing or acidizing tool.

Additionally, the acid, after having been used to treat the well formation, may be caused to recirculate from the well bore back into the acidizing tool, from whence it may again be expelled either as jets of acid or as an unrestricted stream of acid, to again treat the formation and the well bore. Further, any formation of the well may be cleansed by the action of the jets of acid, and thereafter, without removing the apparatus from the well hole, the same formation may be treated with an unrestricted stream of acid.

We claim:

1. An improved device for treating wells, which comprises a string of hollow tubing adapted to be lowered into a well hole and to conduct thereinto a fluid under pressure, a cylindrical housing connected to said tubing having a perforate tube longitudinally disposed therein dividing at least a portion of the same into an inner and outer chamber, nozzles disposed in the wall of said housing and in immediate communication with said outer chamber and adapted to eject therefrom in the form of jets a fluid supplied thereto under pressure, said housing having ports formed in the walls thereof in immediate communication with said inner chamber and adapted to eject therefrom in the form of an unrestrained stream a fluid supplied thereto under pressure, and means to open and close the communication between said chambers and said ports.

2. An improved device for treating wells, which comprises a string of hollow tubing adapted to be lowered into a well hole and conduct thereinto a fluid under pressure, a housing connected to said tubing having a tubular partition member disposed therein dividing at least a portion of the same into an inner and outer chamber, nozzles disposed in the wall of said housing and in immediate communication with said outer chamber and adapted to eject therefrom in the form of jets a fluid supplied thereto under pressure, said housing having ports formed in the walls thereof in immediate communication with said inner chamber and adapted to eject therefrom in the form of a non-jetting stream a fluid supplied thereto under pressure, and means to open and close the communication between said chambers and said ports.

ORLIN W. LYONS.
JAMES H. ADKISON.